United States Patent [19]
Boyle et al.

[11] Patent Number: 5,440,626
[45] Date of Patent: Aug. 8, 1995

[54] ARRANGEMENT FOR SHARING A TELEPHONE OFFICE CODE

[75] Inventors: Valerie Y. Boyle, Wheaton; Ronald B. Martin, Carol Stream; Robert A. Swanson, Naperville, all of Ill.

[73] Assignee: AT&T Corp., Murray Hill, N.J.

[21] Appl. No.: 281,961

[22] Filed: Jul. 28, 1994

Related U.S. Application Data

[63] Continuation-in-part of Ser. No. 156,546, Nov. 23, 1993.

[51] Int. Cl.6 .................... H04M 7/00; H04M 3/00
[52] U.S. Cl. ........................... 379/219; 379/230; 379/242; 379/273
[58] Field of Search .............. 379/230, 269, 271, 272, 379/273, 279, 219, 220, 221, 229, 242

[56] References Cited

U.S. PATENT DOCUMENTS

| | | | |
|---|---|---|---|
| 5,048,081 | 9/1991 | Gavaras et al. | 379/230 X |
| 5,237,604 | 10/1993 | Ryan | 379/220 |
| 5,255,315 | 10/1993 | Bushnell | 379/221 |

OTHER PUBLICATIONS

A. S. Philip, "The System X Digital Switching Subsystem (DSS)", *Systems Technology*, Sep. 1979, pp. 5–19.

*Primary Examiner*—James L. Dwyer
*Assistant Examiner*—Harry S. Hong
*Attorney, Agent, or Firm*—Werner Ulrich

[57] ABSTRACT

An end office of the PSTN, which employs independent switching networks which share one or more office codes, is served by a single assigned node on the CCS network. The signaling processor which serves the assigned node, screens all incoming call messages (IAM)'s; directs messages which include an appropriate Channel Identification Code (CIC) to the switching network that serves that CIC; rejects messages that include an improper CIC; and requests that the calling office assign a different CIC to the incoming call. In an alternate configuration, a signaling message intercept unit is interposed between a signal transfer point (STP) and end switches, to determine which of two or more switches should receive a message, based on the directory number, a circuit identifier or a message index of the received message, and forwards the message to the correct switch.

11 Claims, 7 Drawing Sheets

ARRANGEMENT FOR SHARING A TELEPHONE OFFICE CODE

CROSS-REFERENCE TO RELATED APPLICATION

This application is a continuation-in-part of: Robert B. Martin entitled "Arrangement For Sharing A Telephone Office Code," Ser. No. 08/156,546, filed Nov. 23, 1993, an application assigned to the assignee of the present application.

TECHNICAL FIELD

This invention relates to communication switching networks which employ a Common Channel Signaling overlay network to control establishment of communication connections.

BACKGROUND OF THE INVENTION

The Public Switched Telephone Network (PSTN) comprises: a large number of end switching offices serving local subscriber lines and trunks; a smaller plurality of tandem switching offices for providing connections between end offices; a communication network comprising a large plurality of analog and digital communication paths interconnecting the end offices and tandem offices; optional data bases; and a Common Channel Signaling (CCS) overlay signaling network comprising: a number of interconnected Signal Transfer Points (STP)'s for transmitting and switching data messages among the switching offices for managing connection and release of paths of the communication network; and for conveying special service requests. For the purpose of identification in the CCS network, the switching offices of the PSTN are assigned discrete "point codes" which identify a node of the signaling network which is assigned to an office. Similarly, communication paths (trunks) between offices are assigned Circuit Identification Codes (CIC)'s which are used by the offices to establish appropriate connections through their respective communication switching networks. Switching office translations of Circuit Identification Codes identify both the point of termination of the path on the associated communication switching network and characteristics of the path, e.g., analog or digital.

Calls between subscribers are established on the basis of a National Numbering Plan which requires seven or ten digits to define a called subscriber. A seven digit directory number comprises a three digit office code and a four digit line identifier. A ten digit directory number comprises an additional three digit Area Code which precedes the office code. A modern electronic switching system can simultaneously serve a number of such office codes.

There are a number of local situations in which the operations of an existing end office can benefit from the introduction of an additional switching network which shares one or more office codes with an existing switching network. Emerging technology, e.g., introduction of digital facilities to subscribers; population growth in an area served by an end switching office; excessive traffic due to changes in calling patterns handled by an office; replacement of an existing switching network over a period of time; growth of a PBX; and introduction of an alternate service provider are examples of such local situations. When a switching network is added to an existing end office, it is generally desirable that transfer of subscriber lines between an existing switching network and a new switching network be made without changes of directory number. In some cases, transfer of subscriber lines takes place over a long period of time find the original switching network will eventually be abandoned. In any case, this can cause major administrative difficulties including updates to STPs already in the network. This difficulty is especially apparent for many of the STPs which are already in the field, such as the DSC MegaHub® STP manufactured by DSC Corporation, which have limited memory capacity which makes it difficult to require additional functionality in these units.

A number of arrangements for sharing an office code by two switching networks have been proposed in the prior art. One such arrangement is shown in U.S. Pat. No. 5,237,604 which was issued on Aug. 17, 1993. In accordance with that patent, switching networks which share an office code are assigned different point codes and different nodes on the signaling network; and determination of the routing of Initial Address Messages (IAM)'s to the appropriate point code is left to the calling office. An office which is serving an incoming or originating call, determines whether or not the office code of the called number is shared by two switches; and if the office code is shared, a supplementary inquiry is made of a database which is accessible by a number of offices to identify the switching network that is assigned the called directory number. Armed with this information, the calling office can direct the call to the appropriate point code in the signaling network. While this prior art system achieves a desired end result, it: (a) increases the number of nodes on the signaling network; (b) requires independent signaling processors for the networks which share an office code; (c) substantially increases the call processing time of all calling offices; (d) increases traffic on the signaling network; and (e) requires installation of the shared database and updating of the records therein. In summary, this approach requires substantial modification of the overall network to accommodate a shared office code system.

The introduction of U.S. Pat. No. 5,237,604 describes two other prior art systems. One such prior art system routes all calls to an original switching network which passes calls to the added switch over foreign exchange lines; and the other referenced system provides permanent call forwarding of a directory number of a shared office code to a pseudo number of the added switch. Neither of these solutions has proved economically feasible.

Another prior art system is found in U.S. Pat. No. 5,255,315 which was issued on Oct. 19, 1993. In accordance with that patent, switching networks which share an office code are assigned different point codes and different nodes on the signaling network; and determination of the routing of call signaling to the appropriate point code is left to the calling office. If the called office determines that an incoming call is to a subscriber line served by the network receiving the incoming call, i.e., the called switching network, the called switching network: (a) directs the incoming call to the called switching network (itself); and (b) returns an Address Complete "ACCEPT" message to the calling office. However, if an incoming call is to a subscriber line served by an added switching network, the called switching network sends a special "RELEASE" message to the calling office. The release message includes a release "CAUSE" code which indicates that the called directory number is not served by the responding network and identifies the point code of the added network. The calling office generates a new IAM which is directed to the identified point code of the added network. While the system of this patent overcomes some of the problems of the prior art, the requirement for added independent point codes and added independent processors to serve those nodes remain. Additionally, there are messages such as user to user information messages which are not associated with a call having a circuit connection; this arrangement does not serve such messages.

DISCLOSURE OF THE INVENTION

In accordance with the present invention, an end office of the PSTN (a code sharing office), which employs independent local switching networks that share one or more office codes, is served by a single assigned node and point code on the CCS network. Similarly, in connecting offices, communication channels of trunk groups which serve a code sharing office are treated as a single facility set without distinction as to their appearance on the networks of the sharing office. Since the other member offices of the PSTN have no knowledge of the office code sharing arrangement, traffic with a code sharing office in accordance with this invention, are handled in the same way as routine calls to and from any office of the PSTN.

The signaling processor which serves the assigned node on the CCS network, screens all incoming call messages (IAM)'s; directs messages which include an appropriate Channel Identification Code (CIC) to the local switching network that serves that CIC in the normal manner of the prior art; but rejects messages that include a CIC from an improper trunk group, and requests that the calling office assign a CIC from a specific trunk group or trunk group set connected to the other local switching network which serves the called subscriber to the incoming call.

Thereafter, all signaling messages which relate to an established connection through a network of a shared office are routed to the appropriate local switch within the shared office on the basis of a Channel Identification Code (CIC) which is included in all such messages. Many of the messages which contain a CIC are termed "Integrated Services User Part" (ISUP) messages.

Additionally, there are non-call-associated ISUP messages such as non-call-associated user to user information messages. Such messages may be routed originally by the directory number, and subsequently by an index as explained below.

For messages which are not associated with a call connection, and which therefore do not include a CIC, the Signaling Processor, for the purpose of correlating and routing, maintains indexed records of such messages in a scratchpad memory. Each such record in memory comprises an index value and the identity of the related local switch. In terms of the protocol on the signaling network, messages which do not include a CIC are termed "Transaction Capability Application Part" (TCAP) messages. An example of such an indexed message is a remote data base query.

Accordingly, the single node signal processor serves several switches having a common office code, without burden on other switching systems, and it can route all signaling messages to the correct local switch on the basis of: a CIC, DN, or an indexing term.

In an alternate configuration, a signaling message intercept unit (SMIU) is placed between an STP and one or more switches. The SMIU intercepts the messages, and, where necessary, changes the destination point code. The SMIU then forwards the message to the possibly changed destination point code. The SMIU can also perform the function of responding to an IAM by sending a release message and cause, as described above.

DETAILED DESCRIPTION

Figure 1:
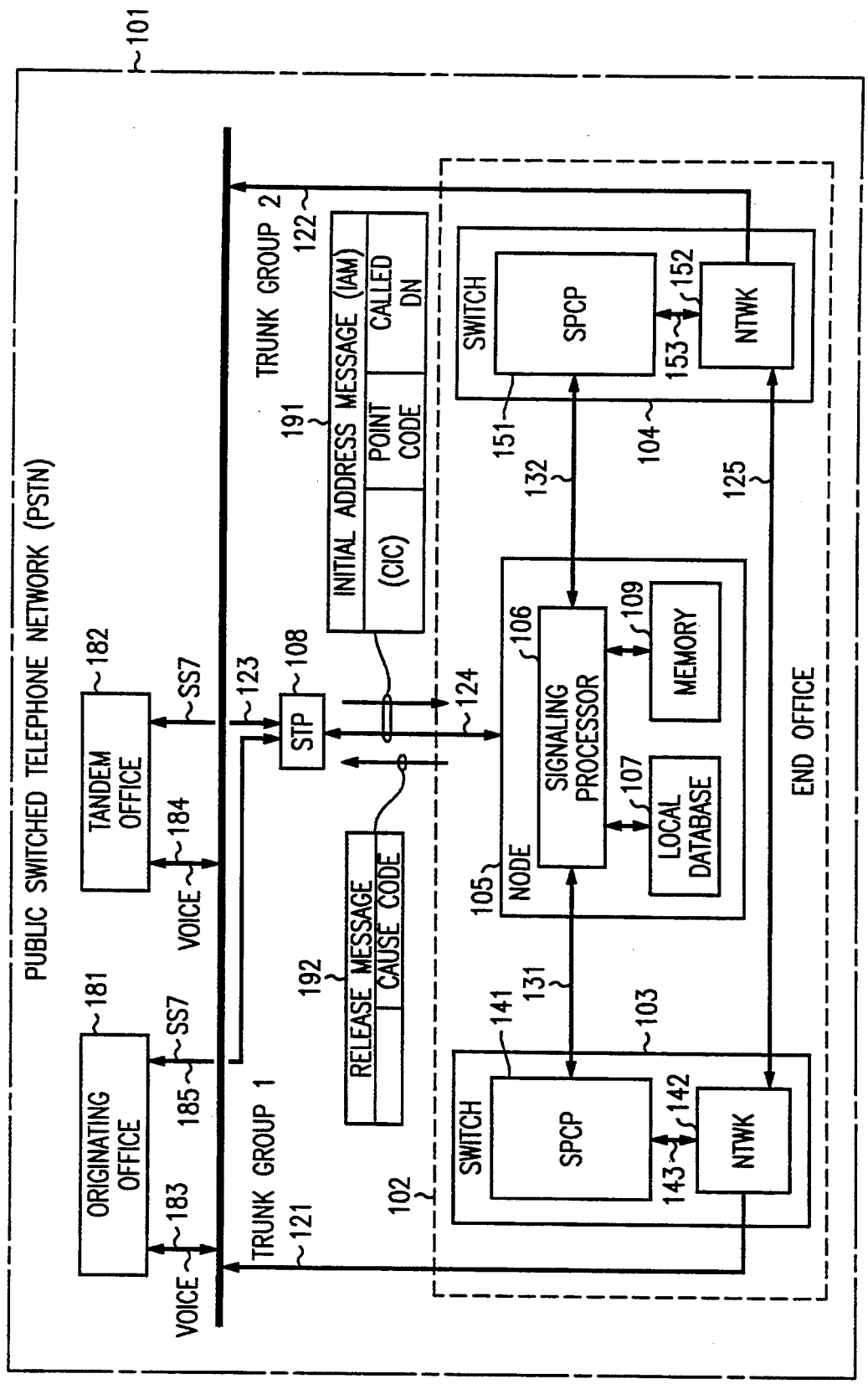
FIG. 1 is a schematic diagram of an end office with two switches sharing an office code.

FIG. 1 illustrates the practice of the present invention in the context of the Public Switched Telephone Network (PSTN). PSTN 101 comprises: a plurality of end offices, e.g., 102, 181; a plurality of Tandem offices, e.g., 182; voice network communication paths, e.g., 121, 122, 183, 184; a Common Channel Signaling (CCS) network comprising: a plurality of Signal Transfer points, e.g., 108, a plurality of signaling network paths, e.g., 123, 124, 185. As seen in FIG. 1, voice Trunk Group 121 terminates in analog network 142 of switch 103; and Trunk Group 122 terminates in network 152 of digital switch 104. In accordance with the present invention, the two trunk groups, from the viewpoint of Tandem Switch 182, form a single facility set without distinction as to their physical appearances on the networks 142, 152 of office 102. In addition, a trunk group 125 interconnects networks 142 and 152 for calls between customers of switch 102 and customers of switch 103.

In FIG. 1, End Office 102 comprises two independent local switches 103 and 104 which share one or more office codes. Customers and trunks are connected to these switches on switch ports. Advantageously, from the perspective of the member offices of the PSTN, an office code sharing end office in accordance with this invention, e.g., end office 102 is indistinguishable from any other office of the PSTN. For the purpose of this description the term "switch" means a free-standing switching system with an internal Stored Program Control Processor (SPCP) and a communication network for interconnecting lines and trunks served by the switch. In the illustrative embodiment of FIG. 1, Switches 103 and 104 may be analog or digital switches available from any one or more suppliers. Solely for the purpose of this discussion, it is assumed that switch 103 is a 1A ESS TM analog switch manufactured by AT&T Network Systems and Switch 104 is a 5ESS ® digital switch which is also manufactured by AT&T Network Systems. Advantageously, in accordance with the present invention, subscribers may be moved between switches 103 and 104 without a change of assigned directory number for any of a number of reasons.

A decision to add a digital switch to an analog office and to share one or more offices codes between an existing analog switch, e.g., 103 and an added digital switch 104 provides a graceful way to: (a) immediately serve subscribers who have a current need for the features of a digital network, and (b) "cap" an existing switch to migrate customers to a new technology switch over a reasonable period of time. By way of example, subscribers initially assigned to analog switch 103 may be physically transferred to digital switch 104 for service in order to take advantages of the features of the digital switch while retaining their directory number.

In Public Switched Telephone Network 101, member offices 102, 181, 182 provide interoffice communication over voice paths 121, 122, 183, and 184 in accordance with information exchanged over a Common Channel Signaling (CCS) network comprising: a plurality of Signal Transfer Points, e.g., STP 108 and signaling channels, e.g., 123, 124, 185. Although information is exchanged between offices in industry standard message formats, a high level understanding of only two message formats is required to fully comprehend the present invention. The one message is termed an "Initial Address Message" (IAM) which advises an end office of a request to establish a connection through the end office between a voice channel identified in the IAM by a Channel Identification Code (CIC) and a called Directory Number (DN) which is also part of the IAM. If a received IAM is complete and otherwise in order, the receiving end office returns an "Address Complete Message" to the connected office and initiates a connection through its switching network between the voice channel which is identified by the CIC and the called DN. If a received IAM is not complete, or otherwise not in order, the end office so advises the connected office and terminates processing of the faulty IAM. As explained later herein, in the practice of the present invention, the second message of interest is a "Release Message," used when it is recognized that the call is coming in on a trunk connected to the incorrect switching network, which requests that the connected office use a channel from an identified trunk group or trunk group set and transmit a new IAM with a CIC for a channel from the requested trunk group.

Figure 2:
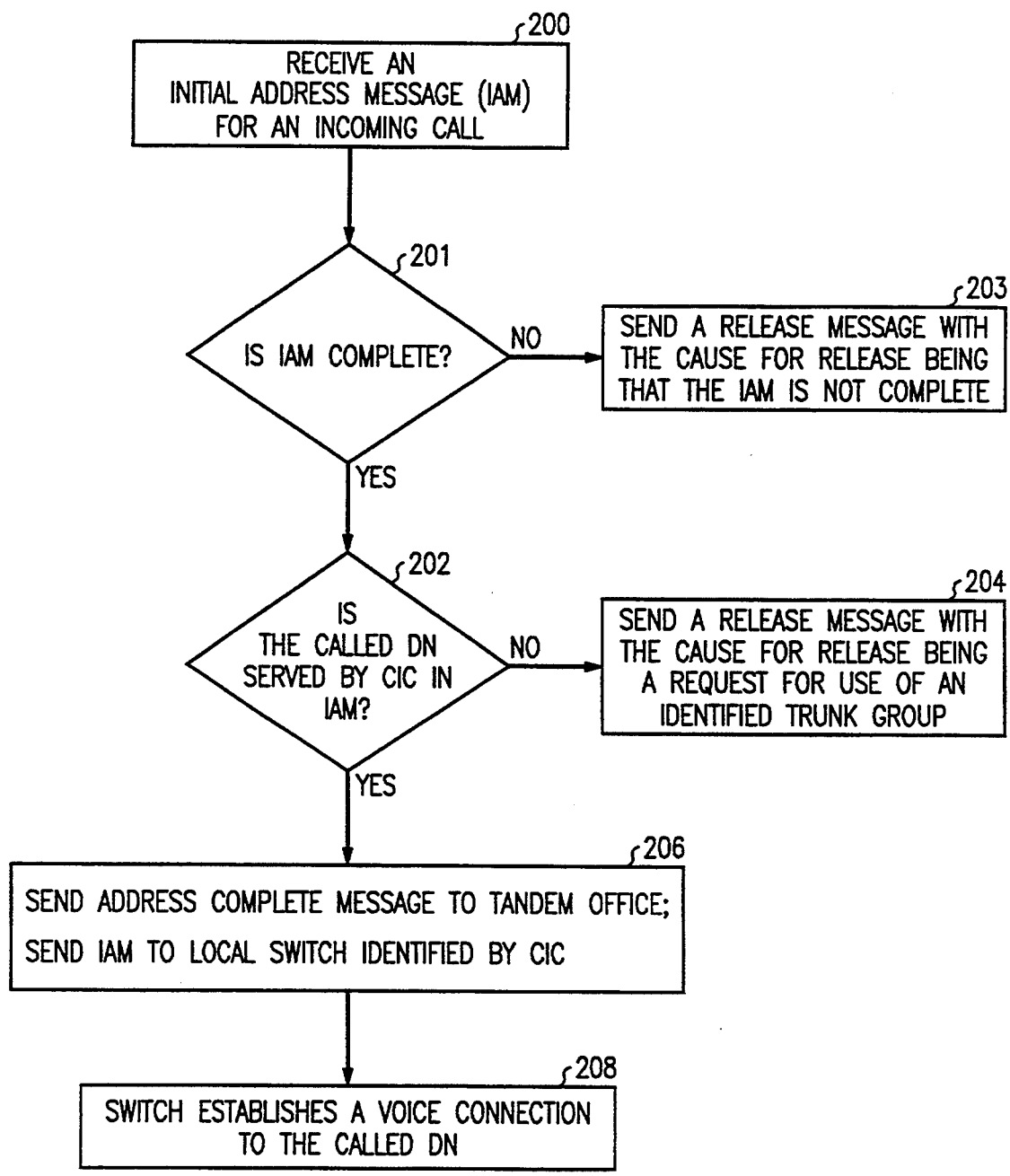
FIG. 2 is a flow diagram of end switch processing of IAM messages.
Figure 3:
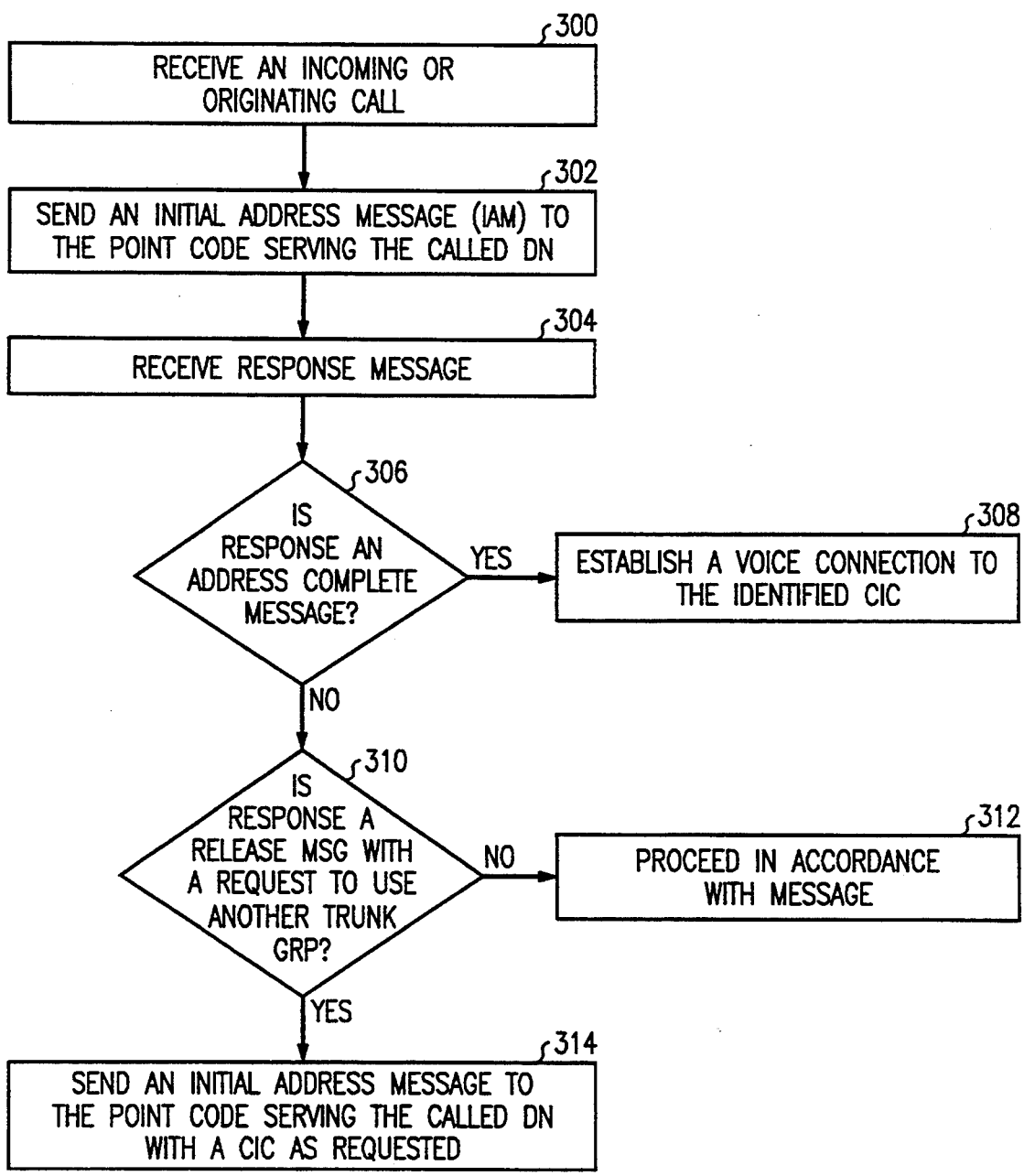
FIG. 3 is a flow diagram of call processing in a tandem office.

The flow of IAM and Release Messages is illustrated in FIG. 1, and the processing of those messages is shown in FIGS. 2 and 3. In the illustrative examples of FIG. 1, a call to a Directory Number (DN) in end office 102 originates in Originating Office 181 and passes through one or more offices of the PSTN, e.g., through Tandem Office 182 before reaching office 102. The principles of the present invention are fully understood by reference to signaling between Tandem Office 182 and End Office 102.

In an attempt to complete the call from office 181 to office 102, Initial Address Message 191 is conveyed from office 182 to office 102 via STP 108. IAM 191, in addition to administrative data, e.g., message header, etc, comprises: (a) a Point Code which identifies the signaling network node which is assigned to office 102; (b) a Channel Identification Code which identifies a channel of one of the trunk groups 121,122; and (c) the called Directory Number (DN). In FIG. 1, the node on the signaling network which is assigned to office 102 is labeled 105 and node processor 106 provides an intelligent interface between signaling network path 124 and information paths 131 and 132 which communicate with switch 103 and 104 respectively. The functionality of processor 106 is found in a 1AESS switching system. An example of a processor arrangement which is suitable for use as processor 106 is found in U.S. Pat. No. 4,752,924 which was issued on Jun. 21, 1988. It is the responsibility of processor 106 to: (a) examine all IAM messages for completeness, (b) transmit responses to IAM messages, and pass complete messages to a switch, e.g., 103. The interfaces between the node and the switches and between the node and the signaling network are called node ports on the node side and switch signaling ports on the switch side. In the implementation of the present invention, processor 106 screens IAM messages to determine whether or not the called DN and the channel code CIC, assigned by the office sending the IAM message as part of the prior art process of establishing a connection, appear on the same network. This determination is made by reference to Local Database 107 which includes data for determining DN to switch assignments. As explained later, if the DN and CIC are not assigned to the same switch, a Release Message 192 is returned to the Tandem Office 191. The possibility of wrong channel assignments to a called DN is brought about by the fact that Tandem Office 182 considers trunk groups 121 and 122 to be a single facility set. Advantageously, a large number of IAM messages to an office code sharing end office will assign a correct CIC to the called DN and the incoming call can be completed without any additional message exchange. Since it is only necessary that the called DN and the assigned CIC appear on the same switch, an IAM may make proper CIC assignments to both networks.

FIG. 2—End Switch Processing of IAM MESSAGES

The flow diagram of FIG. 2, except for decision tree 202 and action box 204 follows standard IAM processing in an end office that has a single switch. IAM messages for incoming calls, as explained earlier herein, are checked to assure that the message is complete and otherwise in good order. Decision tree 201 represents the results of such inquiry. If an IAM is not complete, or otherwise not in good order, the "NO" output of tree 202 is active and a release message is sent to the office that originated the IAM. The release message, as a cause for the message, indicates that the IAM was not complete or otherwise in good order.

If a received IAM is complete and in good order, the "YES" output of tree 201 is active, and that IAM is examined to determine whether or not the CIC and the called DN are associated with the same switch, either switch 103 or switch 104. Decision tree 202 represents the results of that inquiry. If the CIC assignment is consistent, i.e., appropriate for the called DN, the "YES" output of tree 202 is active and operations specified in action box 206 are performed. In response receipt of a complete IAM with an appropriate CIC assignment, an ADDRESS COMPLETE message is transmitted to the office that sent the IAM, the contents of the IAM are sent to the local switch which is identified by the CIC. In turn the serving switch completes a talking connection between the channel identified by the CIC and the called DN.

If the CIC in an IAM message is not consistent, i.e., is not appropriate for the called DN, the "NO" output of tree 202 is active and, as shown in action box 204, a Release Message, e.g., message 192 of FIG. 1, is sent to the office that originated the rejected IAM. As the "Cause", the Release Message requests that a channel from a particular trunk group, 121 or 122 as appropriate, be used in a new IAM for the incoming call to the DN of the rejected IAM. Alternatively, the Release Message may specify a routing index for selecting an appropriate trunk group.

Signaling messages which relate to an established connection through a network of a shared office are directed to the appropriate local switch 103, 104 within the shared office 102 on the basis of a Channel Identification Code (CIC) which is included in all such messages. Messages such as those discussed above contain a CIC and include call-associated "Integrated Services User Part" (ISUP) messages.

The Signaling Processor, for the purpose of correlating and routing related messages that do not include a CIC, maintains indexed records of such messages in a scratchpad memory. Each record in memory comprises an index value and the identity of the related local switch. In terms of the protocol on the signaling network, messages which do not include a CIC include non-call-associated ISUP messages and Transaction Capability Application Part (TCAP) messages.

An example of a non-call-associated ISUP message is a non-call-associated "User to User Information" (UUI) message of an ISDN network. This message type serves to transmit data from a calling subscriber to an identified called subscriber without establishing a network connection between the calling and called subscribers. The data is conveyed to the called subscriber by way of a User to User Information message over the signaling network. For a related set of user to user messages, the directory number may be used for routing a first such message, after which an index for a message exchange can be used for routing further messages.

Examples of TCAP messages are "Data Inquiry" and "Data Response" messages by which data requests and data responses can be exchanged between member switching systems of the PSTN or between a member switching system and a data base. The signal processor correlates related inquiry and response messages on the basis of translations of components of such messages, which may include an index or a directory number.

As seen from the above discussion, the present invention does not require any additional equipment or changes in operating procedures in offices other than the sharing end office.

FIG. 3—Tandem Switch Processing of IAM MESSAGES

The flow diagram of FIG. 3, except for decision tree 310 and action box 314 follows standard IAM and response message processing in a tandem office. Upon receipt of an incoming or originating call (action 301), the tandem office prepares and sends an Initial Address Message (action 302) to the point code serving the called DN; and thereafter expects to receive a response message (action 306). If a response message is an address complete message, the YES output of tree 306 is active and a voice connection is established to the CIC identified in the related IAM (action 308). If the response message is not an address complete message, inquiry is made to determine the nature of the response. Decision tree 310 shows the disposition of such inquiry. If the response is a release message with a request to assign a channel in an identified trunk group, the YES output of tree 310 is active, and a new IAM, with a CIC as requested, is transmitted to the point code serving the called DN (action 314). If the response is not such a message, the NO output of tree 310 is active and disposition of the message is as in the Prior Art (action 312). Since all IAM messages are identical in form, processing of a replacement IAM in an end office is as described above herein with respect to an original IAM.

Figure 4:
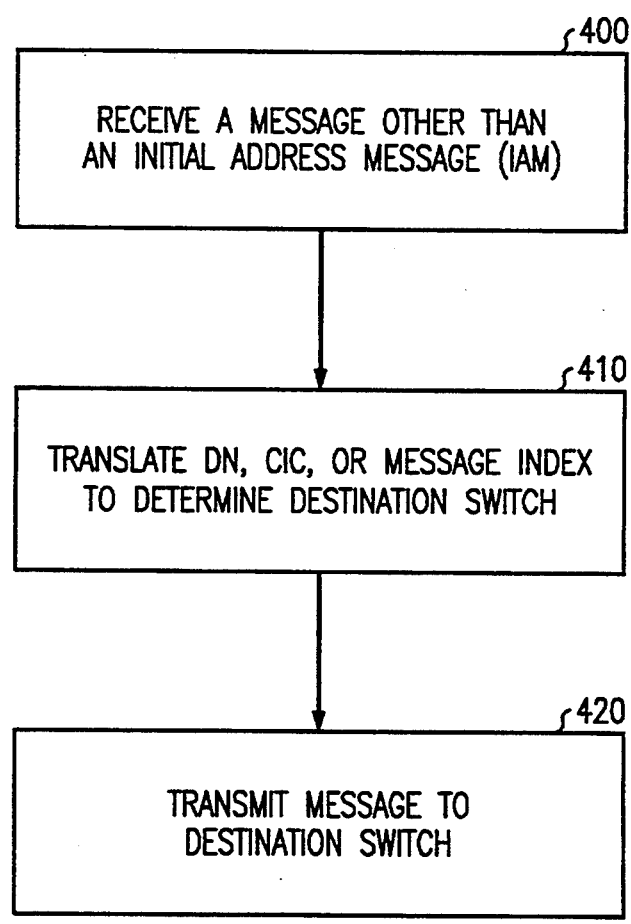
FIG. 4 is a flow diagram of end switch processing of miscellaneous messages.

FIG. 4 End Switch Processing of Miscellaneous Messages

For the purpose of this discussion, a miscellaneous signaling message is any message other than an IAM. It can be a call related message following an IAM, or it can be a message not associated with a call connection, e.g., TCAP. Action block 400 represents receipt of a miscellaneous message. Depending on the type of message, action block 410 translates the DN, CIC, or Message Index of a received message to determine the correct destination switch for the message. In response to such determination signaling processor 106 transmits the message data to that correct destination switch.

This arrangement can also be used for connections to a switch of a Competitive Access Provider (CAP). The CAP switch serves customers whose telephone numbers have not been changed and whose office code was formerly served by a switch such as switch 141. Effectively, the CAP switch is just another switch, sharing an office code, whose signaling is provided from the common signaling node.

Connections between the two switches of the end office can be via a direct trunk group 125 as shown, and over alternate routes via tandem switches. Conventional techniques may be used in selecting such alternate routes.

Figure 5:
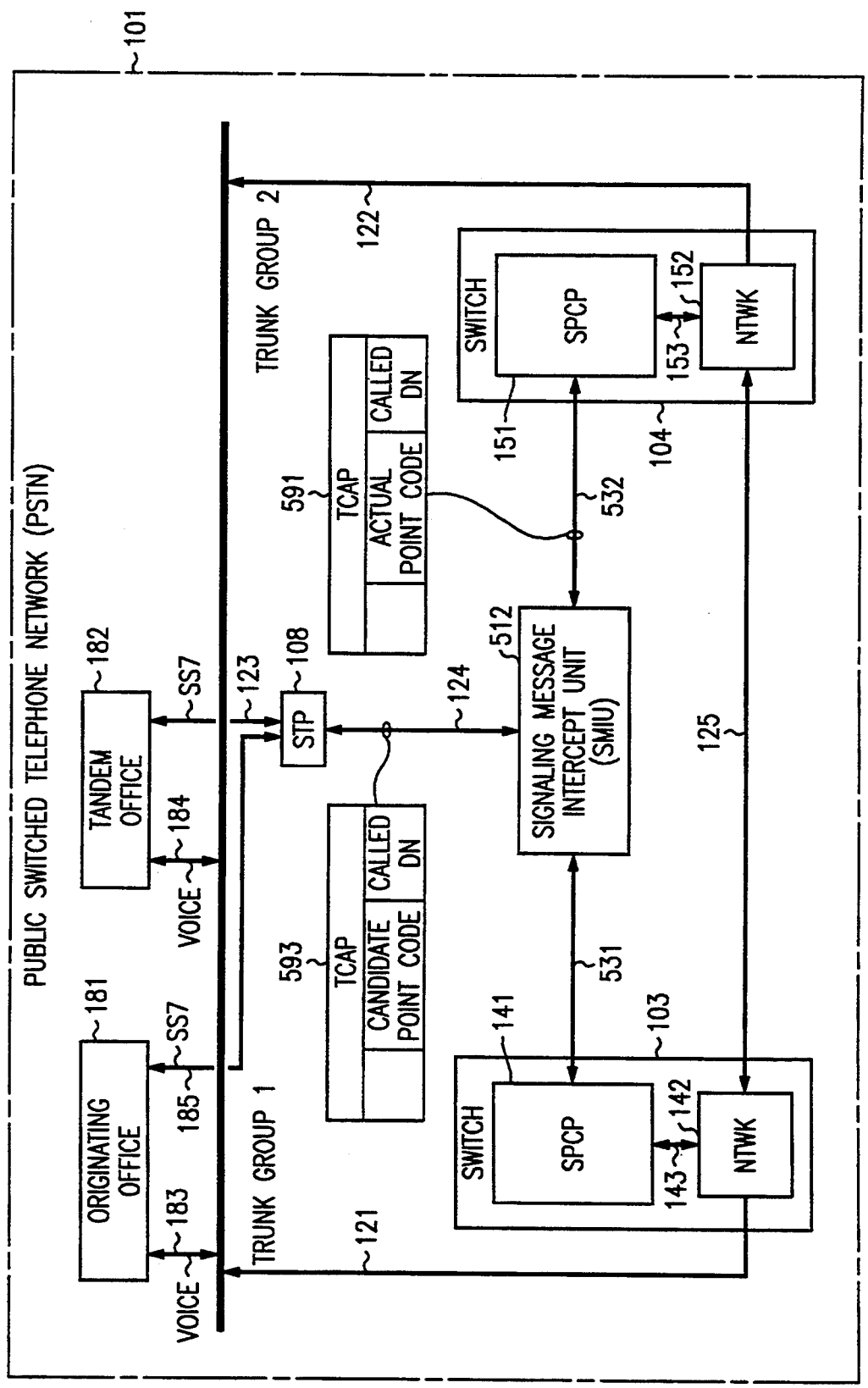
FIG. 5 is a block diagram of an alternative configuration of applicants' invention, using a signaling message intercept unit (SMIU)

FIG. 5 shows an alternate configuration for achieving the advantages of applicants' invention. FIG. 5 is drawn deliberately to resemble FIG. 1 so that the differences in configuration can be more readily observed. However, the type of configuration shown in FIG. 6 may also be used. FIG. 5 shows a signaling message intercept unit 512 which is associated with an STP for the purpose of directing messages to the correct destination switch. This unit is connected to switch 103 via a signaling link (an A-link 531) and to switch 104 via signaling A-link 532. Example message 593, a TCAP message, on an A-link between the STP 108 and signaling message intercept unit 512 contains a candidate point code and the called directory number. Example message 591, a TCAP message, contains an actual point code of switch 104, the destination switch, and the called directory number. While the example message in this case is a TCAP message, the signaling message intercept unit can also process initial address messages essentially as described in FIG. 2 in which case the tandem switch does the same processing as described in FIG. 3.

Figure 6:
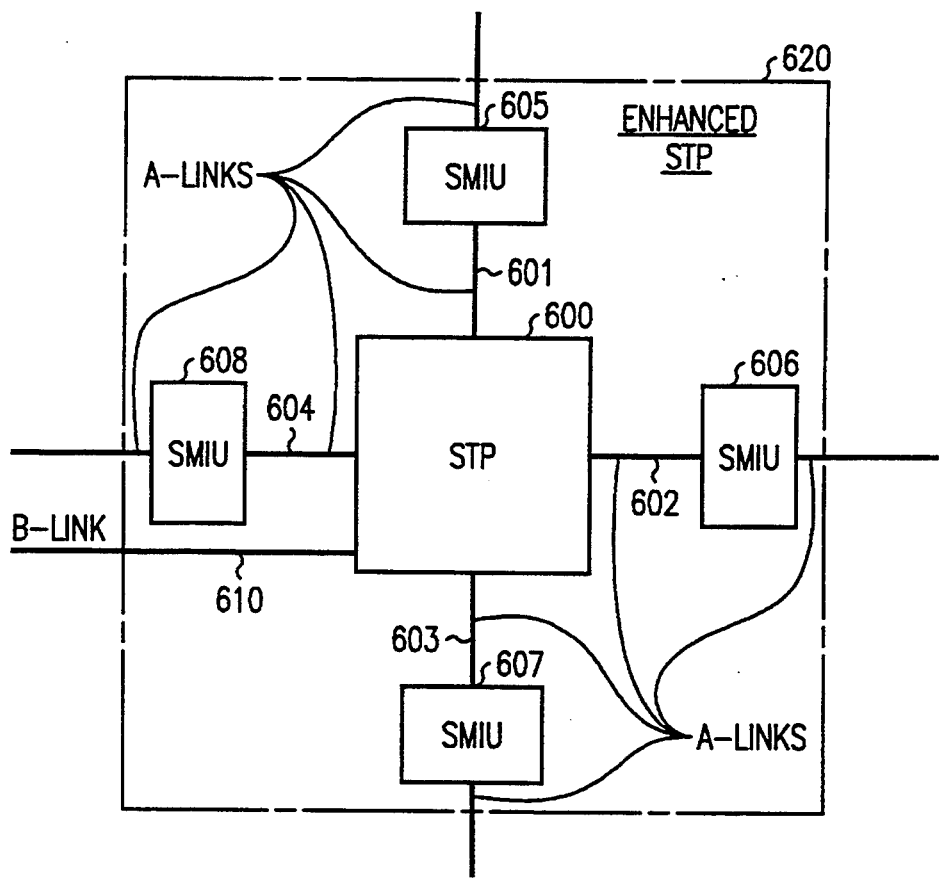
FIG. 6 is a block diagram of an enhanced STP using one or more SMIUs.

Another way of looking at the configuration of FIG. 5 is to concentrate on the relationships between the STP and the signaling message intercept unit. FIG. 6 shows an STP 600 connected by A-links 601, 602, 603, and 604 to signaling message intercept units 605, 606, 607, and 608, respectively. The signaling message intercept units are then connected by A-links to end offices or to a tandem office such as tandem office 182. The STP is also connected to the inter-STP network by one or more B-links such as B-link 610. Effectively, the combination of an STP linked by a plurality of A-links to a plurality of signaling message intercept units acts as an enhanced STP 620 through its ability to carry out the functions of FIG. 2 and FIG. 8.

Figure 7:
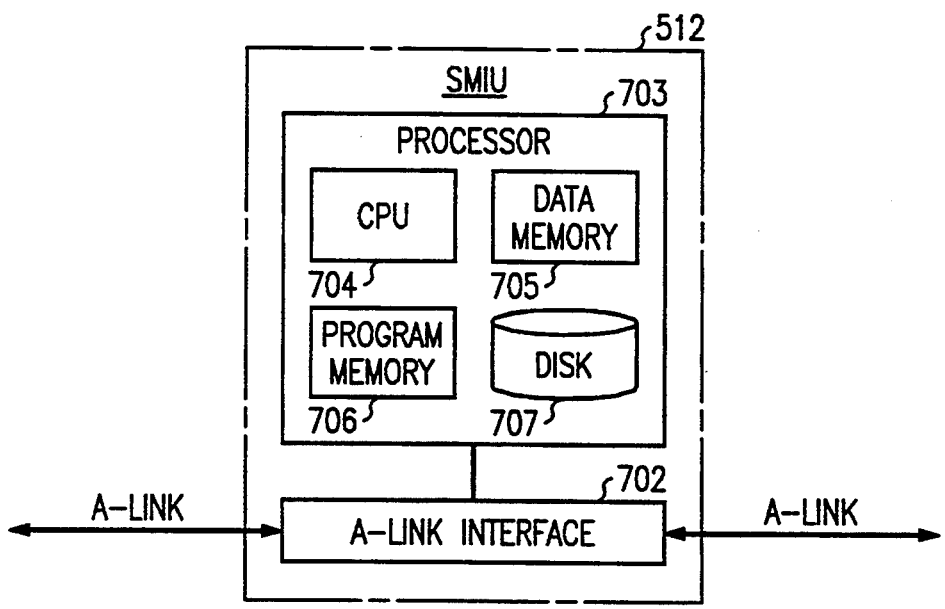
FIG. 7 is a block diagram of an SMIU.

FIG. 7 is a block diagram of a signaling message intercept unit 512. The signaling message intercept unit is connected to other units via A-links and includes an A-link interface 702 for interfacing with these A-links. The A-link interface is connected to a processor 703 which includes a data memory 705, a program memory 706, and a long term mass data memory such as disk 707. Data memory 705 contains the tables necessary for performing the translations required to implement the functions of FIG. 2 and FIG. 8. Program memory 706 stores the programs necessary for controlling the operations of the programs for which flow charts are being supplied in FIGS. 2 and 8 and disk backup 707 is used for storing backup data for data memory 705 and, if appropriate, for paging in data into data memory 705. CPU 704 controls the operations of the memory units of processor 703 and interfaces with A-link interface 702. The signaling message intercept unit can be implemented using a LNX 2000 or a PCX 512 unit plus an SS7 access station as sold by the Excel Corporation. STPs are available from DSC Corporation.

Figure 8:
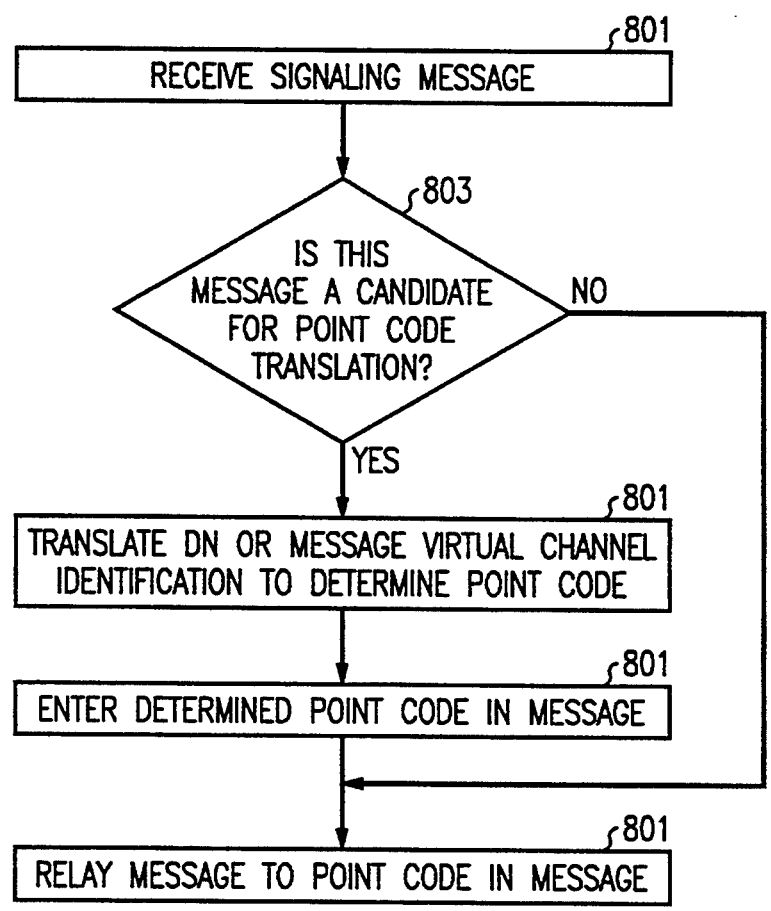
FIG. 8 is a flow diagram of processing in an SMIU.

FIG. 8 is a flow diagram of the operations executed in signaling message intercept unit 512. In block 801, the signaling message intercept unit receives a signaling message. Test 803 is performed to determine whether this message is a candidate for point code translation. A field in the signaling message identifies the category of the message. Message will be translated or not translated according to category, according to candidate point code, or both. The information necessary to decide whether or not the translation is required is stored in data memory 705 (FIG. 7). If it is necessary to translate to the point code, then the directory number, the CIC, or a message virtual channel identification (a message index) is translated to determine the point code (action block 805). This point code is then entered in the message (action block 807) and the signaling message intercept unit relays the message to the point code in the message (action block 809). Note that action block 809 is also performed if it is determined in test 803 that this message is not a candidate for point code translation.

The invention has been described with particular attention to its preferred embodiment; however, it should be understood that variations and modifications within the scope of the invention may occur to those skilled in the art to which the invention pertains.

We claim:

1. An office code sharing end office communication switching system for use in the Public Switched Telephone Network (PSTN), wherein the PSTN comprises a communication switching network comprising: a plurality of member communication switching systems and a plurality of interconnecting communication channels; and a Common Channel Signaling (CCS) network comprising: a plurality of Signal Transfer Points (STP), a plurality of nodes each having individually assigned discrete point codes, and interconnecting signaling channels;
    said office code sharing end office communication switching system comprising:
    a first switch serving at least one office code in a national numbering plan and comprising:
        a first network comprising: a plurality of subscriber line ports assigned individual directory numbers (DN), and a first plurality of trunk ports for connection to a first plurality of trunk channels of said plurality of interconnecting communication channels;
        a first signaling port identified by a first one of said discrete point codes of said CCS network; and
        a first control processor coupled to said signaling port for controlling establishment and release of connections through said first network;
    CHARACTERIZED IN THAT
    said office code sharing end office communication switching system further comprises:
    a second switch, serving, on a shared basis, at least one of said office codes served by said first switch, and comprising:
        a second network comprising a plurality of subscriber line ports assigned individual directory numbers, and a second plurality of trunk ports for connection to a second plurality of trunk channels of said plurality of interconnecting communication channels;
        a second signaling port identified by a second one of said discrete point codes of said CCS network; and
        a second control processor for controlling establishment and release of connections through said second network;
    and signaling message intercept means for receiving signaling messages for incoming calls from a STP, for determining whether a signaling message having a candidate point code of said first switch is destined for said first switch or said second switch, for converting said candidate point code to a convened code, wherein said convened code is selected from one of the two discrete point codes based on a directory number of a message, and for transmitting messages to a signaling port over an interoffice signaling link identified by said converted code.

2. An office code sharing end office communication switching system in accordance with claim 1 CHARACTERIZED IN THAT
    the channels of said first and second pluralities of trunk channels are assigned discrete Circuit Identification Codes (CIC);
    certain of said signaling messages, Initial Address Messages (IAM), identify a called Directory Number (DN) and a CIC to be connected for communication;
    said intercept means accepts, as consistent, an IAM in which the called DN and the requested CIC appear on the network of the same switch; and
    routes a consistent IAM to a switch node port on said same switch.

3. An office code sharing end office communication switching system in accordance with claim 2 CHARACTERIZED IN THAT
    said intercept means, in response to receipt of an inconsistent IAM in which the DN and the requested CIC do not appear on the same switch, transmits a Release Message (RM) to the communication switching system that originated the inconsistent IAM, and as a Cause for release requests a new IAM with a CIC for a channel of an identified one of said first and second pluralities of trunk channels.

4. A method of routing signaling messages, not associated with call connections, in a communication switching office that comprises at least two switches serving a common office code,
    the method comprising:

(a) receiving signaling messages from a STP which do not distinguish between the switches serving the common office code in a facility providing interswitch common channel signaling (CCS) links to said switches;

(b) determining the correct destination switch for each said signaling message on the basis of directory number data of each said message;

(c) transmitting each said signaling message from said facility to said correct destination switch over one of said interswitch CCS message link.

5. The method of claim 4 wherein said data comprises an index for a group of messages.

6. A signaling message intercept unit comprising: signaling interface means;

means for translating between candidate point codes and actual point codes where at least two point codes are associated with a single office code; and wherein said interface means receives messages containing candidate point codes, said means for translating translates candidate point codes to actual point codes based on directory numbers in said messages, and said interface means transmits messages containing actual point codes to switching systems identified by said actual point codes.

7. A method of routing signaling messages, associated with a call connection, in a communication switching network that comprises at least two switches serving a common office code, each of said at least two switches having a different point code for identifying a destination of common channel signaling (CCS) messages the method comprising receiving said signaling message associated with a call connection, from a STP, in a facility for providing interswitch CCS links to said switches, said message comprising a point code of one of said at least two switches;

determining for each said, signaling message a correct destination switch, and a correct point code for said correct destination switch, on the basis of a directory number for said call connection in each said signaling message; and transmitting each said signaling message from said facility to said correct destination switch, identified by said correct point code, over one of said interswitch CCS message link.

8. In a communication switching network that comprises at least two switches serving a common office code, a method of routing signaling messages to one of said switches, the method comprising:

(a) receiving signaling messages from a STP in a facility for providing interswitch common channel signaling links to said switches;

(b) determining whether two data fields, one of which comprises a directory number, of a message point to the same destination switch; and (c) if said two data fields do point to the same destination switch, transmitting said signaling message from said facility to said same destination switch over one of said interswitch CCS links.

9. The method in accordance with claim 8 further comprising (d) rejecting said signaling message if said two data fields do not point to the same destination switch.

10. The method in accordance with claim 9 further comprising (e) transmitting to the source of said rejected message data defining an acceptable signaling message.

11. An enhanced signal transfer point (STP) comprising:

an STP connected to other STPs by at least one inter-STP common channel signaling (CCS) link;

said STP connected to at least one signaling message intercept unit (SMIU) for translating between candidate point codes and actual point codes using a directory number where two point codes are associated with a single office code; and each said at least one SMIU being connected to at least two switches by interswitch CCS links.

* * * * *

UNITED STATES PATENT AND TRADEMARK OFFICE
CERTIFICATE OF CORRECTION

PATENT NO. : 5,440,626

DATED : August 8, 1995

INVENTOR(S) : Valerie Y. Boyle, Ronald B. Martin, Robert A. Swanson

It is certified that error appears in the above-identified patent and that said Letters Patent is hereby corrected as shown below:

Column 11, claim 7, line 39, after "said" delete the comma.

Signed and Sealed this

Twenty-fourth Day of October, 1995

Attest:

BRUCE LEHMAN

*Attesting Officer*          *Commissioner of Patents and Trademarks*